July 28, 1959   M. H. MacKUSICK   2,897,341
FUSIBLE METALLIC ARC METAL WORKING
Filed Feb. 11, 1954   6 Sheets-Sheet 1

INVENTOR
Meredith H. MacKusick
BY
J. P. Moran
ATTORNEY

July 28, 1959

M. H. MacKUSICK 2,897,341

FUSIBLE METALLIC ARC METAL WORKING

Filed Feb. 11, 1954

INVENTOR
*Meredith H. MacKusick*
BY
*J. P. Moran*
ATTORNEY

July 28, 1959     M. H. MacKUSICK     2,897,341
FUSIBLE METALLIC ARC METAL WORKING
Filed Feb. 11, 1954                                   6 Sheets-Sheet 4

INVENTOR
Meredith H. MacKusick
BY
ATTORNEY

United States Patent Office 2,897,341
Patented July 28, 1959

2,897,341

FUSIBLE METALLIC ARC METAL WORKING

Meredith H. MacKusick, Hartville, Ohio, assignor to The Babcock & Wilcox Company, New York, N.Y., a corporation of New Jersey Application February 11, 1954, Serial No. 409,682

5 Claims. (Cl. 219—130)

This invention relates to metal working of the type in which metal from one or more fusible metallic electrodes is deposited and fused onto metal work by one or more electric arcs maintained between the electrodes or between one or more electrodes and the work. More particularly, the invention is directed to an improved metal fusion and deposition method of the foregoing type by which greatly increased metal deposition rates are attained as compared to the best rates obtainable with known electric arc metal fusion and deposition techniques, and to apparatus for practicing such improved method.

The method of the present invention is applicable to any electric arc metal working operation, such as arc welding, metal cladding, etc., whether practiced with bare or coated fusible metallic electrodes, with the so-called "submerged arc" technique, or with the arc zone sheathed in a protective atmosphere of inert gas or gases, and either to A.C. arcs or to D.C. arcs of either straight or reverse polarity. For the purpose of providing a specific illustration of the invention principles, however, the invention will hereinafter be described more particularly as applied to fusible metallic arc welding.

Present techniques for depositing fusible metal by means of the electric arc process generally involve the use of a constant current type of power source, with the current range being generally related to the cross-sectional area of the metallic electrode. The usual arc voltage is of the order of 20 to 35 volts, and is dependent upon factors such as the spacing of the arcing ends of the electrodes, for example, one of which electrodes may be the metal work. In the most commonly used system of arc welding, one terminal of the power source is connected to the metal work and the other terminal thereof is connected to one or more fusible metal welding electrodes or rods. In automatic fusible metal arc welding, wherein the fusible metal rod or wire is fed continuously toward the work as it is fused, the connection of the power source to the rod or wire is usually made through the medium of a pair of contact jaws or of a contact nozzle between or through which the electrode passes, in surface engagement, as it is fed toward the work. Generally, in automatic arc welding the electrode contact means is located relatively close to the arcing end of the electrode, the projection of the electrode beyond the contact means usually being of the order of 1". The welding head and work are moved relatively to each other and the desired arc length is usually maintained by an arc voltage responsive control which governs the feeding rate of the electrode.

The welding power source is usually designed to have a volt-ampere characteristic such that there is some increase in the current flow with a decrease in the arc voltage. This feature provides some inherent stability to the arc, although not enough to obviate the necessity for automatic arc-condition-responsive controls for the electrode feeding means.

With the most efficient multiple bead arc welding techniques used at present, the metal deposit rate for each arc, with a current of 800 amperes, for example, is of the order of 18 to 20 pounds per hour. Where greater deposition rates are necessary or desirable, larger diameter electrodes and increased welding current, or multiple arc arrangements are considered necessary.

It has been the considered opinion of those skilled in the art of electric arc metal deposition that the total current supplied to the arm, for a given rod or wire size, should be so coordinated with the rod diameter or size and the rate at which the rod or wire is fed to the arc that the rod or wire does not get too hot before entering the arc. In accordance with this thinking, substantially all of the heating of the electrode to the melting temperature, and the fusing of the electrode and the work, is effected by the energy liberated in the arc. This practice has become so well established that the literature on electric arc metal deposition specifies rod feeding rates and current values definitely coordinated with rod or wire size for each particular operation.

In distinct contrast to the foregoing prior art teachings, the present invention achieves metal deposition rates several times those attainable with such prior techniques, and with percentage increases in power input which are only a fraction of the percentage increases in metal deposion rates. Such multiplication of the metal deposit rates per arc hour with only fractional increases in power input are accomplished by heating the welding rod or wire, as it is fed toward the arc, to such an extent that the temperature of the rod as it reaches the arc is approaching the melting temperature of the rod and may, in some instances, actually be substantially equal to the melting temperature. As the temperature of the rod is approaching its melting temperature as it reaches the arc, the time increment normally required for the arc to heat the rod from substantially ambient temperature to the rod melting temperature, and to fuse the rod, is reduced to a value approaching zero. The portion of the available arc energy normally required to so heat the rod to its melting temperature is also correspondingly reduced to a value approaching zero. Thereby, the major portion of the arc energy is available to transfer the fusible metal across the arc and to heat the work area, and little, if any, of the arc energy is dissipated in heating the rod or wire to its melting point and fusing the rod or wire. In the present invention, with the same amount of arc energy available as in the prior art, the reduction in the time increment required for arc energy heating and fusing of the fusible rod or wire permits the rod or wire to be fed into the arc at rates which are a multiple of those practically usable in prior art techniques, which latter are limited by the capacity of the arc to heat the rod or wire from substantially ambient temperature to the melting temperature and to fuse the rod or wire. As the metal deposition rate is a direct function of the rod size and feeding rate, the multiplication of feed rate results in a corresponding multiplication of metal deposition rate.

The high preheating of the welding rod or wire before it enters the arc, which is a fundamental feature of the present invention, may be effected in any desired manner. Preferably, however, such high preheating of the rod or wire is effected electrically, and a preferred method of attaining a highly elevated temperature at the arcing end of the welding electrode rod or wire is to effect a flow of current through the electrode having a density so coordinated with the feeding rate of the electrode that the resistance heating of the electrode, due to the high density current flow, will be effected for a sufficient period of time to assure the temperature of the electrode at its arcing end approaching the melting temperature of the electrode. In practicing the invention method, this internal resistance heating of the electrode by the prolonged flow of current therethrough may be accomplished in different manners. For example, a source of potential, in addition to and distinct from the welding potential, may be applied to the electrode between a point on the electrode and the arcing end, this separate potential having a value such that the current flow through the electrode between such point and the arcing end, as a result of the applied potential, when coordinated with the time required for any incremental section of the electrode to pass from such point to the arc, is sufficient to heat the electrode to a value approaching the melting temperature of the electrode before the electrode enters the arc.

A preferred mode of attaining such $I^2RT$ heating of the electrode in a simple and effective manner is to increase the extent of projection of the electrode beyond the contact jaws or nozzle to the arcing point to a value several times that currently used in electric arc metal working. As the arc potential is applied to the electrode at the electrode contact means, this increase in the projected length of the electrode will result in any incremental section of the electrode having a greatly increased time period of travel between the contact jaws and the arc. Consequently, with the welding current flowing through the electrode between the contact means and the arc, there is a much greater period of time (T) for the current (I) to heat the electrode due to the electrode resistance (R) in accordance with the formula:

$$\text{Heating} = I^2RT$$

By measuring the time necessary for a particular size (diameter) electrode to melt at a predetermined density of current flow therethrough, the projected length of the electrode may be accurately selected, in coordination with the feeding rate of the electrode, to insure that the time the electrode is subjected to $I^2R$ heating is sufficient to raise the temperature of the electrode at or immediately adjacent its arcing end to a value approaching its melting temperature.

In this preferred arrangement the required current flow for resistance heating the electrode is effected by increasing the total potential applied to the arc circuit.

If the same current flow is used as in prior art arc welding operations, this increase in applied potential will result in a corresponding increase in power input to the arc circuit. However, the percentage increase in power input is only a fraction of the percentage increase in the metal deposit rate attained thereby.

The foregoing will be clearer from the following comparison. In a conventional submerged arc welding operation using present techniques, with an electrode projection of the order of 1", a metal deposit rate of 18-20 pounds per arc hour can be obtained using a current of 850 amperes with a load voltage of 30 volts. The power input is thus 25,500 watts. For comparison purposes, this power input may be arbitrarily divided into one-third (8500 watts) for electrode melting, one-third (8500 watts) for work piece melting, and one-third (8500 watts) for flux melting.

In applying the invention principles to a submerged arc welding operation with a current of the same value (850 amperes), the electrode projection was increased to about 3½", or to a little over three times the normal projection. The load voltage was increased to 60 volts, or double the value used in the conventional set-up. Thus, the power input is increased to 51,000 watts.

The same power will be needed to melt the work piece (8500 watts) and to melt the flux (8500 watts) leaving 34,000 watts to melt the electrode by $I^2RT$ heating of the greatly increased projected length of the electrode beyond the contact means. With these conditions, a deposit rate of 76 pounds per arc hour was obtained with a completely satisfactory weld metal deposit. Thus, the metal deposit rate was increased to approximately four times the conventional rate with the power input being only doubled. Stated another way, for a 100% increase in power input, a 300% increase in metal deposit rate is attained with the present invention. Thus, the improved results attained with the invention method are out of all proportion to the required increase in power input. While the foregoing example is typical of the results achieved with the invention process, it is not limiting, and other specific examples will be given hereinafter.

As the invention method results in the electrode temperature at the arcing end approaching the melting temperature, the electrode is at at least a visible red heat between a point downstream of the contact means and the arc. This visibly heated length of the electrode may be used advantageously to provide a simple control of the arcing operation, as by utilizing a radiant energy responsive device to sense the visible heat or radiant energy of the electrode. In turn, such a sensing device may be used to actuate a novel adjusting means for raising and lowering the electrode contact means relative to the work to maintain the required projected length of the electrode between the contact means and the arc, or to control the wire feeding rate.

The $I^2RT$ heating of the electrode, with high current densities in the electrode, results in effective self-stabilization of the arcing circuit, but there may be minor fluctuations in the several controlling conditions due, for example, to fluctuations in the supply voltage or to the actual point of current entry into the electrode shifting somewhat lengthwise of the contact means as a result of possible surface irregularities in the latter or in the electrode, or as a result of wear. Hence, it may be desirable to use an overall automatic control in the welding operation even though the system is inherently self-stabilizing.

For an understanding of the invention principles, reference is made to the following description of typical embodiments thereof as illustrated in the accompanying drawings. In the drawings.

Figure 1:
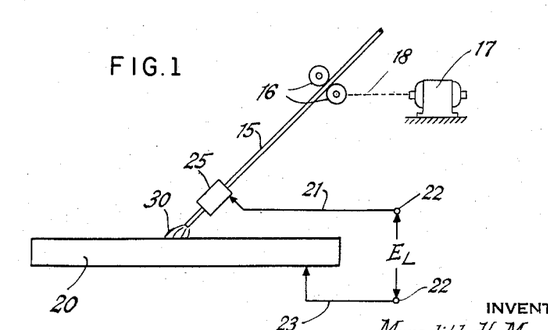
Fig. 1 is a schematic elevation view of automatic arc welding apparatus illustrating the relation of the electrode contact means to a workpiece in the welding circuit, in accordance with prior art teachings.

Referring to the drawings, Fig. 1 schematically illustrates a typical conventional automatic fusible metal arc welding operation, in which a fusible metal wire or rod electrode 15 is arranged to be fed toward metal workpiece 20 by suitable means such as feed rollers 16 driven by a motor 17, usually through the medium of reduction gearing indicated schematically by the broken line 18. The feeding rate of rod 15 is usually made responsive to an electrical characteristic of the arc, such as arc current or arc voltage, and this characteristic is applied, through conventional control means, to vary the speed of operation of motor 17.

Downstream of rollers 16, electrode 15 passes through contact means such as an electrically conductive nozzle, or electrically conductive contact jaws 25 connected by conductor 21 to one terminal 22 of a welding power. The other terminal 22 of the source is connected by conductor 23 to metal workpiece 20. In present day practice, the source connected to terminals 22 is a welding current transformer or generator arranged to supply a substantially constant preset current to the arc at an arc or load voltage $E_L$ of the order of 20–35 volts, depending on the type of welding operation involved.

The power input, during welding, is the product of the load voltage $E_L$ and the welding current. As stated, this power input is divided between the power required to melt the electrode 15, that required to melt workpiece 20, and that required to fuse the flux (if the electrode 15 is flux coated or if the welding operation is of the flux-submerged arc type). The projection of electrode 15 beyond contact means 25 is only of the order of one inch (1"), usually ranging from ¾" to 1¼", so that there is insufficient time for any effective resistance heating of electrode 15 to be effected while the electrode moves from contact means 25 to arc 30.

In accordance with present day literature and practice in the welding art, the total current supplied to the welding circuit and the feeding rate of the electrode are so coordinated with the electrode size (diameter) that the electrode, in passing from contact means 25 to the arc 30, is not appreciably heated by the flow of current through electrode 15 between means 25 and arc 30. In conventional welding practice at normal current densities, the time it takes electrode 15 to travel from means 25 to arc 30 as a result of the very short projection of electrode 15 beyond means 25 before entering arc 30, there is insufficient time for any effective resistance heating of electrode 15 to take place. Consequently, substantially all of the energy required to melt or fuse electrode 15 is supplied from arc 30. With the illustrated conventional arrangement, the actual metal deposit rate per arc per hour is of the order of 18–20 pounds at a current of the order of 800 amperes, for example. Even the deposit rates claimed by certain manufacturers for their welding equipment or process do not exceed 30 pounds per arc per hour at a current of the order of 1000 amperes, and such claimed rates are not generally attainable in practice.

As distinct from these prior art deposition rates, the present invention attains, for the same welding current, deposit rates per arc per hour several times those attainable with the best techniques hitherto known or available, and with only a small increase in the energy input to the welding circuit, the percentage increase in the energy input being only a fraction of the percentage increase in deposit rates resultant therefrom. This is accomplished by dividing the total energy input between a quantum liberated in the arc or arcs in the usual manner and a quantum utilized in heating the electrode, as it is fed to the arc, to such an extent that the temperature of the electrode at its arcing end approaches its melting temperature. While the imput of additional energy into the electrode to so heat the latter may be effected in any suitable manner as the electrode is fed toward the arc, as by heating the electrode by means of gas or electrically energized muffle furnaces, it is preferred that the energy input to heat the electrode be in the form of electrical energy. This may be effected by induction heating of the electrode, but the heating of the electrode as it is fed to the arc is preferably effected by causing an electric current flow through the electrode of a density so coordinated with the electrode feeding rate that the internal heating of the electrode, by virtue of its electrical resistance, is sufficient, and is sufficiently prolonged, to raise the temperature of the electrode, as it reaches the arc, to a value approaching its melting temperature.

This $I^2RT$ heating of the electrode may be effected by supplying current to the electrode at any point sufficiently upstream of the arc to assure the necessary heating time for the electrode, as coordinated with the current density, the electrode feeding rate, and the resistivity of the electrode material. Preferably, the required time during which the electrode is heated to its melting point by resistance heating is attained by increasing the electrode projection beyond the contact means to a value several times the usual projection, and utilizing the welding current fed through the contact means to provide the resistance heating. The load voltage while welding is increased to provide a sufficient IR drop in the projected electrode portion to effect the desired $I^2RT$ heating.

In accordance with the invention, the quantum of energy input utilized in heating the electrode or electrodes, as the latter are fed to the arc, may range from 10% to 200%, or more, of the quantum of the energy input liberated in the arc or arcs. The heating of the electrode or electrodes should be of sufficient duration to establish therein a temperature gradient of from 500° F. to 2500° F. per inch of electrode length heated.

Figures 2, 5, 12:
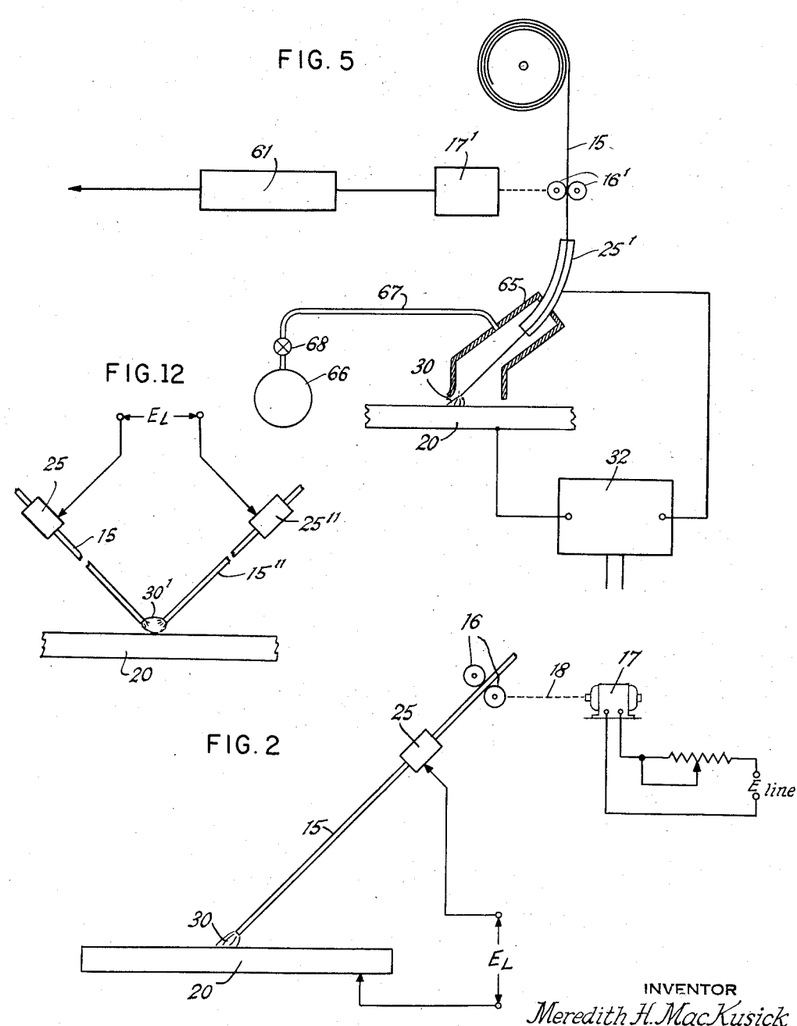
Fig. 2 is a similar view illustrating such relation in accordance with the principles of the present invention.
Fig. 5 is a view similar to Fig. 3 schematically illustrating the invention principles as applied to inert gas shielded electric arc welding.
Fig. 12 is a schematic elevation view of series arc welding apparatus embodying the invention.

Referring to Fig. 2, which schematically illustrates a preferred embodiment of the invention, the spacing of contact means 25 from arc 30 is increased to a value several times the conventional projection of the order of one inch (1"), and the energy input to the welding circuit is also increased so that, with the same amount or quantum of energy liberated in the arc as with the conventional projection of electrode or rod 15, energy is available for electrically heating the electrode as it is fed to arc 30. The spacing of contact means 25 from arc 30, in the invention arrangement, may be 4" to 5" for a ⅛" diameter rod or electrode, the spacing being proportionately increased for larger size electrodes and decreased for smaller size electrodes. In contrast, the electrode projection used in the prior art is of the order of 1" for all rod sizes.

In addition to varying in accordance with rod size, the projection of the electrode beyond the contact means, in the invention arrangement, is also dependent upon the desired feed rate and inversely dependent upon the current flow.

The feed rate is a direct function of the desired deposit rate. Taking the electrode size, the feed rate, and the current value into consideration, the electrode projection is so set that the time required for electrode 15 to pass from contact means 25 to arc 30 is sufficient for the selected current value to heat the electrode, by $I^2RT$ heating, to the desired temperature as it enters arc 30, this temperature approaching the melting temperature of the electrode material.

The increase in the energy input is selected to provide the desired heating gradient in the rod as the latter is fed toward the arc. Approximately the same amount of energy is liberated in the arc as is liberated in the arc in conventional welding at the same current with the same size rod, this energy liberated in the arc being utilized in melting the workpiece, melting the flux (if used), and melting the electrode. The same amount of energy is, of course, required to melt the work and the flux, if used. However, as the electrode or rod entering the arc is already at a high temperature, which may approach its melting temperature, the arc-liberated energy available to melt the electrode can melt the latter at a much greater rate than in the prior art techniques, thereby effecting a substantial increase in deposit rates.

Taking the illustration previously given, by way of example, wherein a current of 850 amperes at 30 volts is used, the energy input of 25,500 watts is substantially all liberated in the arc. This energy input may be arbitrarily divided into 8500 watts used to melt the workpiece, 8500 watts used to melt the flux, and 8500 watts used to melt the electrode. With these values applied to a ³⁄₃₂" electrode with a conventional projection of the order of 1", a deposit rate of 18–20 pounds per arc hour can be obtained.

Using the same size electrode and the same current, in the invention method the electrode projection is increased to approximately 3½" and the voltage to approximately 60 volts. The energy input is thus doubled, with the increased quantum of input energy being utilized in internal resistance heating of the electrode. This increase in energy input is 25,500 watts which, added to the 8500 watts of arc-liberated energy available to melt the electrode, provides a total of 34,000 watts available to heat the electrode as it is fed toward the arc and to melt the electrode. With these conditions, a deposit rate of 76 pounds per arc hour has been obtained, thus substantially quadrupling the deposit rate with only twice the energy input. Thus, the required increase in energy input is only a minor fraction of the increase obtained in deposit rates where the increase in energy is used to heat the electrode by internal resistance heating effected by substantially increasing the distance between the electrode contact means and the arc.

The foregoing illustration is cited merely by way of example, and at a later point herein, other and more typical examples of the greatly increased deposit rates achieved with the present invention will be given. Before proceding to give such examples, a more detailed description of how the invention is carried out in practice will be given.

Figure 3:
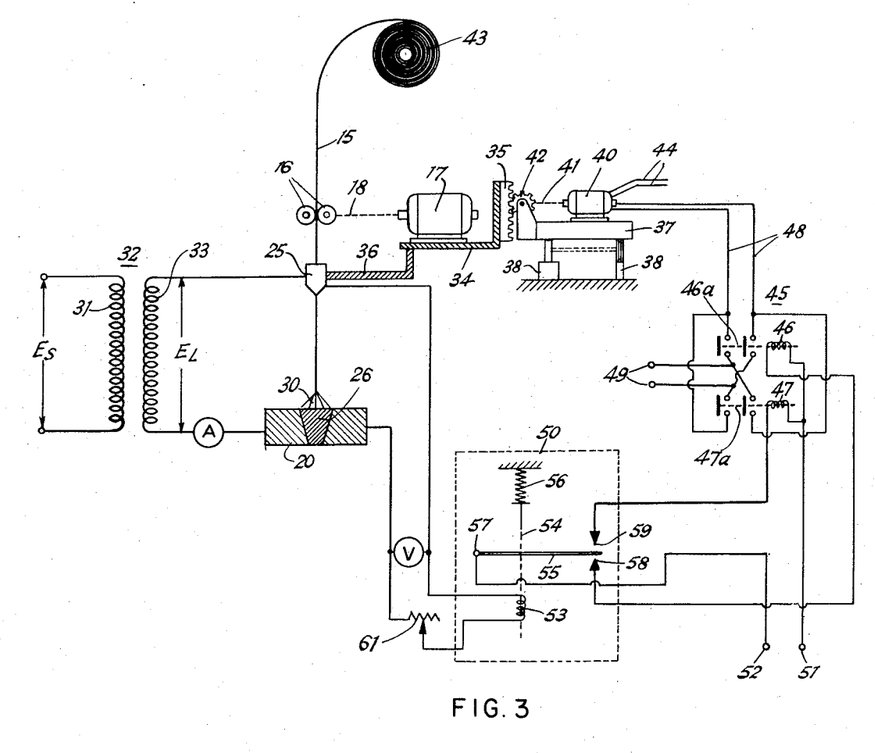
Fig. 3 is a schematic, part sectional and part elevation, view of automatic arc welding apparatus for practicing the invention method, and embodying automatic means controlling the distance between electrode contact means and the workpiece.

Fig. 3 illustrates schematically one typical arrangement for practicing the invention, the same reference characters as used in Figs. 1 and 2 being used to designate corresponding parts. To simplify the illustration, manual adjustment means and movement limiting controls, as used in practice, have been omitted. In the arrangement of Fig. 3, the required spacing of contact means 25 from workpiece 20 is attained by controlling the distance between means 25 and workpiece 20 automatically in response to the voltage drop between the contact means 25 and the workpiece. The line voltage $E_s$ is applied to the primary winding 31 of a transformer 32 whose secondary winding 33 develops the welding load voltage $E_L$. The terminals of winding 33 are respectively connected to contact nozzle 25 and workpiece 20, the latter being illustrated as having a weld deposit 26 joining two portions of the workpiece.

Motor 17 is mounted on a suitable support 34 having a vertically extending rack 35 thereon, and a rigid extension 36 secured to nozzle 25, so that nozzle 25 is movable with support 34. The support 34 is vertically reciprocable on a carriage 37 arranged to travel along tracks 38, 38 extending in parallel relation to the welding groove or seam. Carriage 38 supports a motor 40 which, through suitable gearing indicated by broken line 41, drives a pinion 42 engaged with rack 35. Carriage 37 may also support the coil 43 from which electrode 15 is drawn.

A constant field energization for motor 40 is provided through leads 44. The armature current of motor 40 is supplied from terminals 49 through a switching arrangement generally indicated at 45. This switching arrangement includes a "down" relay coil 46 and an "up" relay coil 47 respectively arranged to operate switches to supply current in reverse directions through the armature of motor 40, the relay coils respectively operating switches 46a and 47a for selectively connecting the armature leads 48 to terminals 49. Switching arrangement 45, in effect, is an electrically operated reversing switch.

One terminal of each of the relay coils 46 and 47 is connected to a control voltage supply terminal 51. The other terminal of each coil is arranged to be selectively connected to the opposite control voltage terminal 52 through the medium of a voltage sensitive relay generally indicated at 50. This relay includes an energizing coil 53 having a movable armature 54 normally biased in one direction by a coil spring 56 to balance the normal pull of coil 53 on the armature. Armature 54 is connected to a movable switch blade 55 having its pivot 57 connected to terminal 52. Blade 55 is arranged to selectively engage either of a pair of contacts 58 and 59 respectively connected to relay coils 46 and 47.

Relay coil 53 has applied thereto the voltage drop between nozzle 25 and workpiece 20, the appropriate preselected operating voltage being selected by a rheostat 61. This voltage drop is the sum of the voltage drop through the projected portion of electrode 15 and the voltage drop across arc 30 and through workpiece 20. Should such total voltage drop increase from the preselected value, coil 53 will have its energization increased to engage switch blade 55 with contact 58 to energize "down" relay coil 46 to close switch 46a to connect the armature of motor 40 to contacts 49 with a polarity such as to drive motor 40 in a direction to lower platform 34 to restore the preset voltage drop. A corresponding, but reverse, effect takes place when the total voltage drop applied to relay coil 53 decreases, motor 40 remaining idle when the control voltage drop is at the preselected value.

Figure 4:
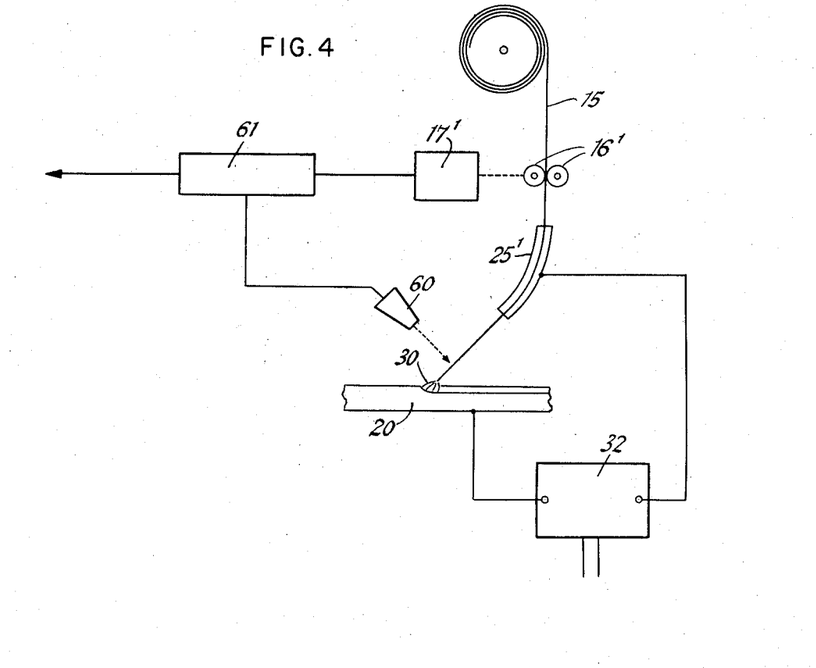
Fig. 4 is a schematic elevation view of automatic welding apparatus embodying the invention, illustrating a radiant energy sensing device controlling the welding operation.
Figure 6:
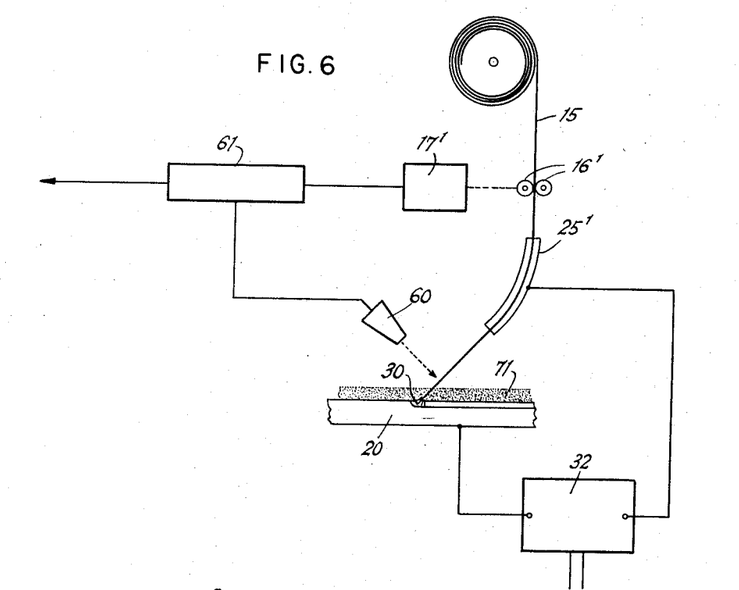
Fig. 6 is a view similar to Fig. 4 schematically illustrating the invention principles as applied to submerged arc welding.

Figs. 4, 5 and 6 illustrate how the invention principles may be applied equally to bare or coated fusible metal arc welding, to inert gas shielded metal arc welding, and to submerged arc welding. In each of these figures, elements corresponding to those in Figs. 1 and 2 have been given corresponding reference numerals primed.

Referring to Fig. 4, which schematically illustrates a novel control arrangement for the invention, the electrode 15 is fed to the work through a contact nozzle indicated at 25'. As the electrode, in its passage from contact nozzle 25' to arc 30, is visibly heated, advantage is taken of the radiant energy of the projecting portion of the electrode to control the electrode feeding rate in order that the "dwell" time of the electrode between contact jaw 25' and arc 30 will be of sufficient duration to assure the electrode temperature at arc 30 being raised, by resistance heating, to a value approaching or equalling its melting temperature. Thus, in the illustrated arrangement, a radiant energy sensitive device 60, which may be a photocell or a thermocouple, is arranged in operative relation to the highly heated portion of electrode 15 projecting from jaw means 25' toward arc 30 and is connected to an electronic control arrangement 61. The output of device 60 varies in response to variations in the radiant energy level in the projecting portion of electrode 15. Through electronic control arrangement 61, such variations are utilized to vary the speed of operation of motor 17', driving feed rolls 16', to vary the electrode feeding rate in a corrective direction.

Fig. 5 schematically illustrates how the invention principles may be applied to inert gas shielded arc welding. In this arrangement, the feed rate of the electrode may be controlled in any desired manner by suitable means connected to electronic controller 61. For example, a voltage sensitive control may be used, or the radiant energy sensitive device 60 of Fig. 4 may be used. A shield 65 is arranged in insulated relation to contact nozzle 25' and encloses the projecting portion of electrode 15, extending to within a short distance of workpiece 20. A suitable inert gas, such as helium or argon, for example, is supplied from a container 66 through a conduit 67 connected to shield 65 and controlled by a valve 68. It will be noted that, in accordance with the principles of the invention, the electrode 15 projects beyond contact jaw 25' a distance which is several times the conventional electrode projection of the order of "1."

Fig. 6 illustrates the invention as applied to submerged arc welding, the radiant energy sensitive control 60 of Fig. 4 being utilized. In this arrangement, the electrode is fed to the work through the layer 71 of granular welding flux in which the arc 30 is submerged in the same manner as in conventional submerged arc welding practice. However, the projection of rod 15 beyond contact means 25 is increased to a value several times that presently used, and the energy input to the welding circuit is increased to provide additional energy for highly heating rod 15 as it is fed toward arc 30.

Figure 7:
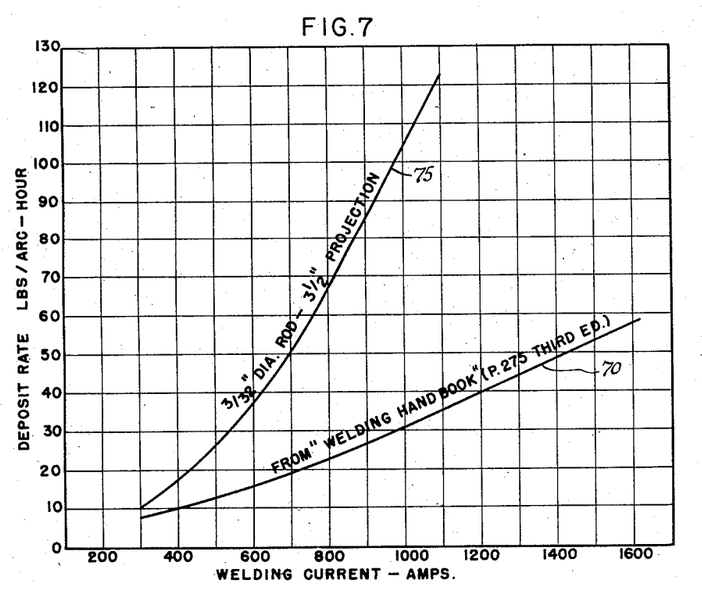
Figs. 7-10 are sets of curves graphically illustrating certain principles of the present invention.

Fig. 7 graphically illustrates the greatly increased metal deposit rates attained with the present invention as compared, for example, to those obtained with conventional submerged arc welding, which latter attains the largest metal deposit rates presently attainable. The curve 70 represents the deposit rates obtainable with conventional submerged arc welding, as taken from page 273 of the "Welding Handbook," 3d edition. The curve 75 represents the rates obtainable with the present invention using a $3/32''$ welding rod projecting $3\frac{1}{2}''$ beyond the contact means toward the arc. For example, with a total current of 800 amperes supplied to the welding circuit, the best deposit rate obtainable with conventional submerged arc welding is about 22 pounds per arc per hour. In contrast, that obtainable with the invention arrangement, using the same 800 amperes but with $I^2RT$ heating, is in excess of 66 pounds per hour. At a higher current value of 1000 amperes, the prior art technique attains a deposit rate of only about 30 pounds per arc hour as compared with a deposit rate of 104 pounds per arc hour with the invention method using internal resistance heating of the electrode. As shown in the foregoing example, and in other typical examples hereinafter, the increase in energy input to effect the $I^2RT$ heating is only a fraction of the increase in deposit rates attained by such increase in energy input.

Figure 8:
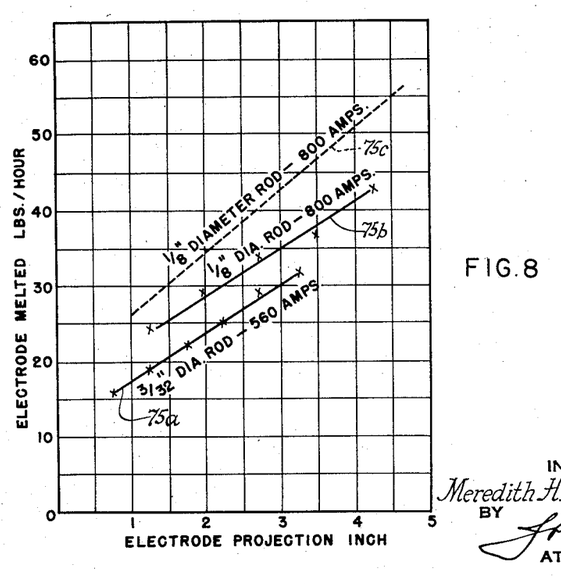

Fig. 8 graphically illustrates the increase in metal deposit rates as the electrode projection beyond the contact means is increased. Thus, with a $3/32''$ rod at 560 amperes, a projection of $1''$ provides a deposit rate of about 17 pounds per hour. Increasing the projection to $3\frac{1}{4}''$ increases the deposit rate to 32 pounds per hour. With a $1/8''$ rod and a current of 800 amperes, a $1.3''$ projection provides a deposit rate of about 24 pounds per arc hour, whereas a projection of $4.3''$ increases the deposit rate to about 43 pounds per arc hour, nearly doubling the deposit rate (curve $75b$). In curve $75c$, which represents a $1/8''$ rod differing in composition from that of curve $75b$, a current of 800 amperes produces a deposit rate of only about 27 pounds per arc hour, with a $1''$ projection, as compared to a deposit rate of 55 pounds per arc hour with a projection of $4.5''$. It will be noted that the 3 curves $75a$, $75b$ and $75c$ are all straight lines, indicating a direct and proportionate relation between electrode projection length and metal deposit rate. This is accounted for by the fact that R, in the expression $I^2RT$, is a direct function of length, and the length subjected to heating due to internal electrical resistance is the length of the electrode projecting beyond the contact means.

Figure 9:
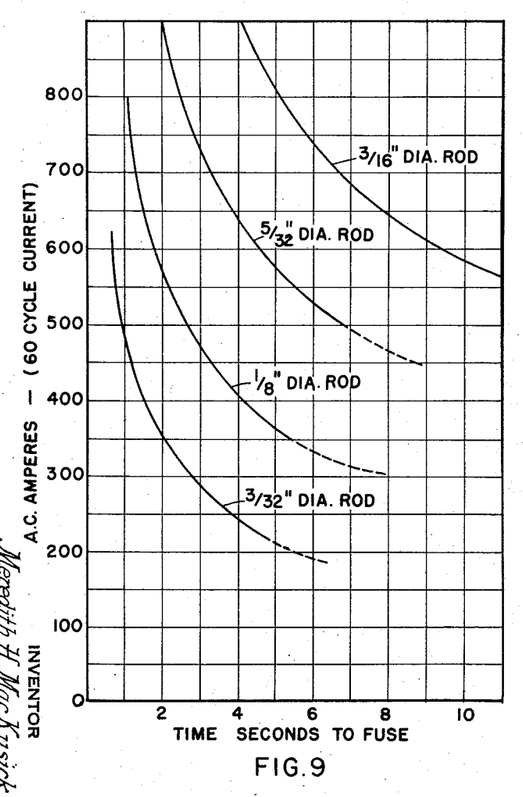

In order to determine the optimum projection of electrode beyond the contact means for a given set of welding conditions, the time for a given diameter or size electrode to fuse with a preselected current flow therethrough must be known. This time may be measured by clamping an electrode between a pair of spaced contacts and effecting the required current flow between the contacts. Noting the time required to fuse the measured electrode length, and knowing the available feeding rate, the distance of the contact means from the arc can be determined so that the time required for the electrode to pass from the contact means to the arc will be sufficient for the electrode to approach its melting temperature as it reaches the arc. Fig. 9 graphically illustrates the time required for various sized electrodes to fuse at different current densities. This table is useable for determining feeding rates necessary to attain desired deposit rates, these two rates being directly related.

Figure 10:
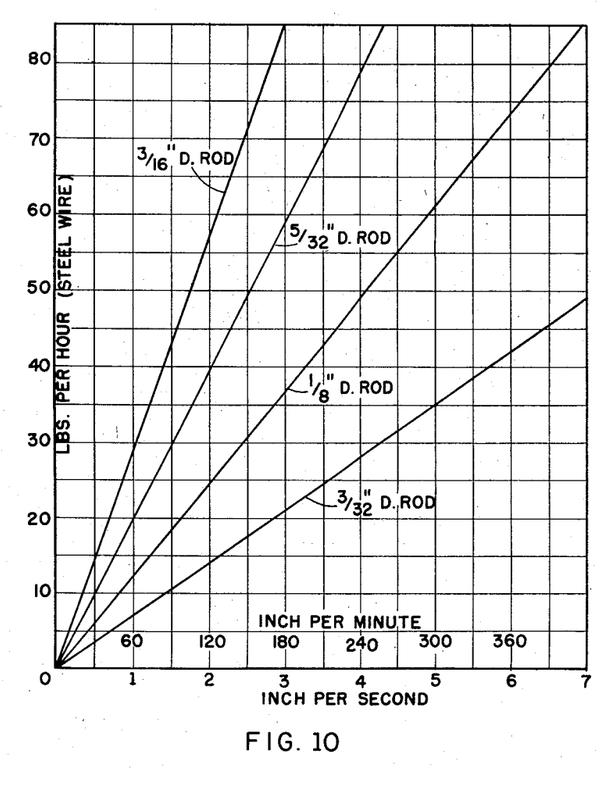

Fig. 10 graphically illustrates the relation between feeding rates and deposit rates for different sized steel rods.

Figure 11:
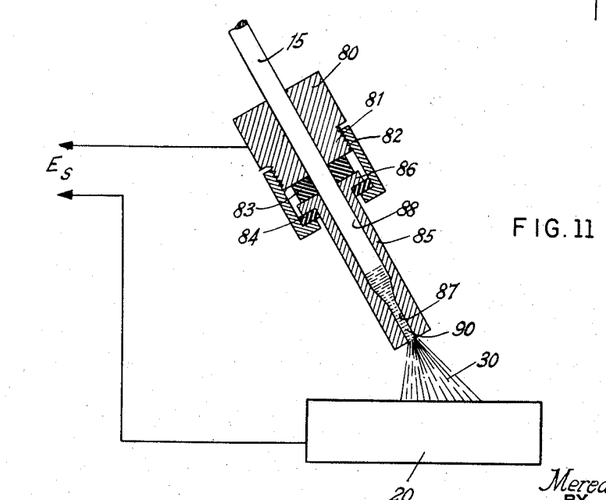
Fig. 11 is a partially schematic sectional view of automatic arc welding apparatus, illustrating a modification of the present invention.

Fig. 11 illustrates a modification of the invention by means of which molten metal may be fed to the arc. In this modification, the power supply is connected to a current contact nozzle 80 and to the workpiece 20. Contact nozzle 80 has a reduced threaded portion 81 which receives a flanged retaining nut 82. This retaining nut holds a guide sleeve 85, of tungsten or other suitable refractory material, in insulated relation to contact nozzle 80, insulators 83 and 84 electrically isolating flange 86 of sleeve 85 from contact nozzle 80 and from nut 82, respectively. With the arrangement of Fig. 11, the current density is so selected with respect to the feeding rate that the electrode 15 reaches its melting temperature at a point somewhat upstream from the reduced portion 87 of the electrode passage 88 in sleeve 85. Consequently, the metal fed through reduced portion 87 is molten and is projected as a jet 90 toward arc 30.

Fig. 12 schematically illustrates the invention as applied to series arc welding which latter is a technique presently used in metal cladding operations. In the arrangement of Fig. 12, the arc $30'$ is maintained between electrodes 15 and $15''$ connected to opposite terminals of source $E_L$. Work 20, representing a metal plate to be clad with metal fused from the electrodes, is not included in the welding circuit, but arc 30 is maintained in fusing relation to the surface of plate 20 which is to be clad.

As distinguished from the prior art series arc welding technique, the projections of electrodes 15 and $15''$ beyond their respective contact means 25, $25''$ are increased to a value several times the conventional projection of the order of $1''$. Thus, the two electrodes, in moving from the contact means to the arc $30'$ are heated by the flow of current therethrough to an extent such that their temperatures, on entering arc $30'$, approach the melting point of the electrodes. As a result, using the invention series arc cladding technique, the cladding deposit rate may be increased 2 to 4 times, for the same current as used in conventional prior art series welding, and with an energy input increase which is only a minor fraction of the increase in deposit rates. For example, with the arrangement of Fig. 5, a $1/8''$ thick cladding can be applied at the rate of 40 square feet per arc hour.

As previously stated, the example given in the earlier part of this description was merely illustrative only. Deposit rates greatly in excess of those previously mentioned have been attained in practice. For example, with a load voltage of 67–70 volts, a current of 1100 amperes, and a $3/32''$ electrode, the current density is 159,000 amperes per square inch. Welding with these conditions, and utilizing the $I^2RT$ heating of the present invention by substantially increasing the electrode projection, a metal deposit rate of over 120 pounds per hour has been attained. Butt welds in $4''$ thick steel plate have been made at these values, the welds fully meeting ASME Code requirements.

With the invention arrangement, providing the greatly increased burn off or deposit rates, greatly increased feed rates are necessary as well as increased travel rates of the arc relative to the workpiece. With an automatic welding head altered to permit a feed rate of approximately $1500''$ per minute, welding operations have been performed at a feed rate of about $1200''$ per minute with a $3/32''$ wire and a supply current of approximately 1100 amperes. With this size wire, a metal deposit rate of 142 pounds per hour per arc has been attained with an increase in power input which is only a minor fraction of the increase in deposit rate. If a $1/8''$ diameter rod is used with this high feeding speed head, deposit rates in excess of 250 pounds per hour are attainable. This latter example is given as an illustration of the potentialities of the invention. However, it should be understood that the metal deposit rates with the present invention are not limited to these figures, and apparently are limited only by such practical considerations as proper handling of large volumes of molten metal, adequate fusion of base or workpiece metal, desired cross-section or contour of welding beads, and similar practical factors. As a further factor, it has been found that when the current density exceeds 50,000 amperes per square inch, with $I^2RT$ heating of the electrode, the welding operation becomes essentially self-stabilizing, so that no automatic control is required to maintain the arc length. Thus, the electrode can be fed to the arc at a constant rate, without the interposition of an arc-characteristic responsive control between the feeding motor and its source of power. For example, in the arrangements of Figs. 2 through 6, the motor 17 or 17' can be connected directly to a power source, preferably through a rheostat or the like for initially setting the desired constant electrode feeding rate.

It should be noted that, while the illustrations and specific examples so far described have mentioned carbon steel electrodes and certain types of welding operation, these references are exemplary only and not by way of limitation. Thus, the invention principles are fully applicable to welding, cladding, etc. with other than carbon steel electrodes, such as electrodes of alloy steels of various types, including stainless steel electrodes, and nonferrous electrodes. Also, while butt welding and cladding operations have been mentioned as specific examples of operations to which the invention principles are applicable, it should be understood that the invention is equally applicable to other metal depositing operations such as fillet welding, for example. The invention principles are also equally applicable to metal depositing with plural electrodes in parallel.

While a specific embodiment of the invention has been shown and described in detail to illustrate the application of the invention principles, it will be understood that the invention may be embodied otherwise without departing from such principles.

What is claimed is:

1. In an electric arc metal deposition process in which metal is deposited onto a fusible metal workpiece by energy liberated from at least one arc maintained between fusible metallic electrodes, one of which may comprise the metal workpiece, while at least one of such electrodes is fed toward an arc as it is fused; the novel steps comprising supplying to such process energy sufficient to maintain the arc voltage at at least its normal value plus additional energy, in excess of the arc liberated energy by an amount of the order of the arc liberated energy; and utilizing such excess energy in heating the fed electrodes to a value such that the electrode temperature equals the melting temperature at a point upstream of the arcing end thereof.

2. In an arc metal deposition process in which metal is deposited onto a fusible metal workpiece by energy liberated from at least one arc maintained between fusible metallic electrodes, one of which may comprise the metal workpiece, by an electric potential applied to the electrodes between points on the latter spaced from the arc while at least one of such electrodes is fed toward an arc as it is fused; maintaining the potential applied to such one electrode at a value of the order of twice that required to maintain the voltage of the associated arc at at least its normal value, to produce a substantial current flow in such one electrode between the point of potential application and its arcing end; and maintaining the distance between such point and the arcing end of such one electrode at a value coordinated with the current density and feeding rate of such one electrode to effect internal electrical resistance heating of the latter of a value sufficient to establish therein, between such point and the arcing end, a temperature gradient of from 500° F. to 2500° F. per inch of electrode length.

3. In an arc metal deposition process in which metal is deposited onto a fusible metal workpiece by energy liberated from an arc maintained between a fusible metallic electrode and the workpiece by an electric potential applied between the workpiece and a point on the electrode spaced from the arc, while feeding the electrode toward the arc as the electrode is fused; maintaining the applied potential at a value of the order of twice that required to maintain the voltage of the arc at at least its normal value, to effect a substantial current flow in the electrode between such point and its arcing end; maintaining the distance between such point and the arc at a value coordinated with the current density and feeding rate of the electrode to effect internal electrical resistance heating of the latter of a value sufficient to establish therein, between such point and such end, a temperature gradient of from 500° F. to 2500° F. per inch of electrode length.

4. Electric arc metal deposition apparatus comprising, in combination, a source of welding current; feeding means operable to feed a fusible metallic electrode toward an arc maintained between such electrode and another electrode connected to such source; contact means connected to said source and in electrically conductive engagement with such fed electrode at a point on the latter spaced from the arc a substantial distance coordinated with the current density in, and feeding rate of, such fed electrode such that the internal resistance heating of the fed electrode, due to the current flow therethrough between such point and the arc, will establish in the fed electrode a temperature gradient sufficient to elevate the electrode temperature, adjacent its arcing end, to a value approaching the melting temperature of the electrode; positioning means controlling the distance between said contact means and the arc; and control means connected to said positioning means and to said contact means and such other electrode to operate said positioning means, responsive to variations in the potential drop between said contact means and such other electrode, to maintain said contact means at such point on the fed electrode.

5. Electric arc metal deposition apparatus comprising, in combination, a source of welding current; feeding means operable to feed a fusible metallic electrode toward an arc maintained between such electrode and another electrode connected to such source; contact means connected to said source and in electrically conductive engagement with such fed electrode at a point on the latter spaced from the arc a substantial distance coordinated with the current density in, and feeding rate of, such fed electrode such that the internal resistance heating of the fed electrode, due to the current flow therethrough between such point and the arc, will establish in the fed electrode a temperature gradient sufficient to elevate the electrode temperature adjacent its arcing end to a value approaching the melting temperature of the electrode; positioning means controlling the distance between said contact means and the arc; and control means connected to said positioning means and to said contact means and such other electrode to operate said positioning means, responsive to variations in an electrical characteristic of the current between said contact means and such other electrode, to maintain said contact means at such point on the fed electrode.

References Cited in the file of this patent

UNITED STATES PATENTS

| | | |
|---|---|---|
| 2,184,765 | Farley et al. | Dec. 26, 1939 |
| 2,405,673 | Scherl | Aug. 13, 1946 |
| 2,430,055 | Kennedy | Nov. 4, 1947 |
| 2,444,834 | Landis et al. | July 6, 1948 |
| 2,504,868 | Muller et al. | Apr. 18, 1950 |
| 2,532,410 | Kennedy | Dec. 5, 1950 |
| 2,669,640 | Outcalt et al. | Feb. 16, 1954 |
| 2,721,249 | Landis | Oct. 18, 1955 |